United States Patent [19]

Potts

[11] Patent Number: 5,234,603
[45] Date of Patent: Aug. 10, 1993

[54] METHODS EMPLOYING A ZIRCONIUM SALT FOR USE IN WASTEWATER TREATMENT

[75] Inventor: Michael E. Potts, Colorado Springs, Colo.

[73] Assignee: Analytical Development Corporation, Colorado Springs, Colo.

[21] Appl. No.: 710,765

[22] Filed: Jun. 4, 1991

[51] Int. Cl.$^5$ .............................................. C02F 1/52
[52] U.S. Cl. ..................... 210/719; 210/720; 210/724; 210/723; 210/738; 210/912; 210/913; 252/631
[58] Field of Search ................ 210/719, 720, 723-728, 210/738, 912, 913; 252/631

[56] References Cited

U.S. PATENT DOCUMENTS

| | | | |
|---|---|---|---|
| 2,873,169 | 2/1959 | Seaborg et al. | 23/14.5 |
| 3,575,854 | 4/1971 | Richards | 210/720 |
| 3,819,051 | 6/1974 | Hendley et al. | 210/720 |
| 3,997,439 | 12/1976 | Ayukawa | 210/721 |
| 4,025,430 | 5/1977 | Pagel | 210/912 |
| 4,061,720 | 12/1977 | Phillips | 423/265 |
| 4,097,430 | 6/1978 | Phillips | 260/17 |
| 4,765,908 | 8/1988 | Monick et al. | 210/728 |
| 4,950,361 | 8/1990 | Bender et al. | 162/181.2 |
| 4,983,306 | 1/1991 | Deininger et al. | 210/724 |

OTHER PUBLICATIONS

Murmann et al. "Experiments Utilizing $FeO_4^{-2}$ for Purifying Water," Water Research, vol. 8, pp. 543–547 (1974).

Gilbert et al., "An Investigation of the Applicability of Ferrate Ion for Disinfection," J. Am. Water Works, vol. 68(9), pp. 495–497 (1986).

Waite et al., "Iron (VI) Ferrate as a General Oxidant for Water and Wastewater Treatment," Ozone/Chloride Dioxide Ocid. Prod., Org. Matter Process Conference (1976), published 1978, pp. 410–425.

"Atomic Absorption Spectrophotometric Determination of Chromium, Iron, and Manganese in Sea Water by the Zironcium Hydroxice Co–Precipitation Method" by Eiko Singubara.

Primary Examiner—Peter Hruskoci
Attorney, Agent, or Firm—Sheridan, Ross & McIntosh

[57] ABSTRACT

A method and composition for treating wastewater streams is provided. The composition includes a zirconium salt and preferably a zirconium carbonate. In addition to the zirconium salt; a ferrate, a reducing agent, a weighting agent and an anionic coagulating agent can also be employed. The method includes the steps of adjusting the pH of a wastewater stream to between about pH 6.5 and about pH 14, adding the composition, precipitating contaminants from the wastewater stream and separating a solution having a reduced contaminants content therefrom.

56 Claims, No Drawings

METHODS EMPLOYING A ZIRCONIUM SALT FOR USE IN WASTEWATER TREATMENT

FIELD OF THE INVENTION

The present invention is generally directed to compositions and methods for precipitating contaminants from wastewater streams, and in particular, compositions and methods which employ a zirconium salt.

BACKGROUND OF THE INVENTION

A number of techniques have been developed to treat wastewater streams in which contaminants are precipitated and separated from the wastewater stream. Such techniques typically include the addition of a chemical composition, such as ferric or ferrous salts, including ferric sulphate, ferric chloride, ferrous chloride and ferrous sulphate.

In the past few years, there has been increased interest by the water treatment industry in the use of ferrate salts, e.g., as possible substitutes for chlorination processes. For example, potassium ferrate may be used in the treatment and purification of water (see Murmann et al, "Experiments Utilizing $FeO_4^{-2}$ for Purifying Water". Water Research, Vol. 8, pp. 79-93 (1974); Gilbert et al., "An Investigation of the Applicability of Ferrate Ion for Disinfection", J. Am. Water Works, Vol. 68(9), pp. 495-497 (1986); and Waite et al., "Iron (VI) Ferrate as a General Oxidant for Water and Wastewater Treatment", Ozone/Chlorine Dioxide Oxid. Prod., Org. Matter Process Conference, (1976), published 1978, pp. 410-425). Ferrate salts are also known as useful for precipitation and/or coagulation of solids in the wastewater.

U.S. Pat. No. 4,983,306 by Deininger et al. and assigned to the University of California, issued Jan. 8, 1991 discloses the use of an alkali metal or alkaline earth metal ferrate to precipitate transuranic elements from wastewater. It is disclosed that a water soluble salt and, in particular, a zirconium salt, can be added with the alkali metal or alkaline earth metal ferrate to provide greater precipitation efficiencies. Specific examples of zirconium salts include those having zirconyl ions ($ZrO^{2+}$) and, in particular, zirconium oxychloride ($ZrOCl_2 \cdot 8H_2O$), zirconium oxybromide and zirconium oxyiodide.

U.S. Pat. No. 2,873,169 by Seaborg et al. and assigned to the U.S. Atomic Energy Commission, issued Feb. 10, 1959 is directed to the precipitation of plutonium from a first aqueous solution using a first carrier precipitate of a basic peroxidic uranium compound. The carrier and its associated plutonium are then dissolved to form a second aqueous solution, and plutonium is separated from the second solution by means of a second carrier which carries plutonium, leaving in solution the uranium and fission products not previously eliminated. Suitable second carriers are phosphates such as bismuth and zirconium phosphates, rare earth fluorides, particularly lanthanum and cerous fluoride and rare earth oxalates.

U.S. Pat. No. 4,097,430 by Phillips assigned to Magnesium Elektron Limited, issued Jun. 27, 1978 discloses methods for employing ammonium or potassium zirconium carbonates to impart thixotropic properties to aqueous dispersions of polymers and copolymers containing a water soluble organic colloid containing a hydroxy group. U.S. Pat. No. 4,061,720 by Phillips assigned to Magnesium Elektron Limited, issued Dec. 6, 1977 discloses an ammonium or potassium zirconium carbonate solution and a method for making such a solution. The solution is stable for at least 10 hours at a temperature of at least 60° C. The solution is prepared by reacting zirconium basic carbonate with an aqueous solution or slurry of either ammonium or potassium carbonate. The solution can be employed in the method disclosed in U.S. Pat. No. 4,097,430, discussed above.

An article entitled "Atomic Absorption Spectrophotometric Determination of Chromium, Iron and Manganese in Sea Water by the Zirconium Hydroxide Co-Precipitation Method" by Eiko Singuvara, in *Hiroshima-Ken Kankyo Senta Kenkyu Hokuku*, pages 6-9, 1980, discloses a method for determining trace amounts of Cr, Fe, and Mn cations coprecipitated with zirconium hydroxide.

One problem with certain precipitation agents is that they are ineffective when employed on some contaminant matrices. As used herein, the terms "matrix" and "matrices" mean the combination of soluble and insoluble materials present and encountered in a wastewater stream which can influence a precipitation process designed to remove contaminants from the wastewater stream. A particular problem is encountered with matrices having low suspended solids content and low concentrations of reducing chemicals.

Therefore, it would be advantageous to provide a method and composition for effectively precipitating contaminants from wastewater streams. It would also be advantageous to provide a composition and method for precipitating contaminants from wastewater streams having low suspended solids matrices with low concentrations of reducing chemicals. Furthermore, it would be advantageous if the composition employed for precipitating contaminants was made up of relatively readily available materials. Further, it would be advantageous if the composition was made up of environmentally acceptable chemicals.

SUMMARY OF THE INVENTION

In accordance with the present invention a composition is provided for use in treating wastewater streams. As used herein, the term "wastewater" will mean any and all aqueous solutions and suspensions which contain contaminants including, for example, process waste streams generated by nuclear industries, metal processing industries, and non-nuclear remediation industries, as well as ground water and other contaminated solutions and suspensions.

The composition of the present invention includes a zirconium salt, and preferably a zirconium carbonate such as $K_2[Zr(CO_3)_2(OH)_2]$. In a preferred embodiment a ferrate salt is also included, for example, an alkali metal or alkaline earth metal ferrate such as potassium ferrate ($K_2FeO_4$). In another embodiment of the invention a reducing agent is included, preferably a thiosulfate salt such as sodium thiosulfate. In another embodiment of the present invention a weighting agent is included in the composition, preferably a carbonate salt such as magnesium carbonate or zinc carbonate. In another embodiment of the present invention an anionic coagulating agent is included, preferably a silicate salt such as sodium silicate.

In accordance with another embodiment of the present invention, a method is provided for treating wastewater to remove contaminants. The method includes the step of adjusting the pH of a contaminant-containing solution to within the range from about pH 6.5 to about pH 14, and preferably in the range from about pH 9 to about pH 13. A composition, which includes a zirconium salt, is added to the contaminant-containing solution to form a precipitate. The precipitate can be separated from the solution to yield a treated solution having a reduced contaminant concentration.

The present invention provides a method and composition which are useful in effectively precipitating contaminants from a wastewater stream. An advantage of an embodiment of the present invention is that the composition and method are highly effective when employed on wastewater streams having low suspended solid matrices, and in particular when the concentration of reducing chemicals in the wastewater stream is relatively low. Furthermore, the composition of the present invention can include readily available materials. Furthermore, the readily available materials are, or can react to form, species which are substantially non-hazardous to biological life and are environmentally acceptable under present standards.

DETAILED DESCRIPTION OF THE INVENTION

In accordance with one embodiment of the invention, a method and composition for precipitating contaminants from wastewater streams are provided. In accordance with a preferred embodiment of the invention, the method and composition are especially well suited for low suspended solids matrices with low concentrations (e.g., less than 10 milligrams per liter) of reducing chemicals. Examples of reducing chemicals include nitrites and sulfides. A preferred composition and method can also work efficiently in other matrices, for example, matrices that contain high concentrations of suspended solids and low concentrations of reducing chemicals.

In accordance with one embodiment of the present invention, a composition which includes a zirconium salt is provided for precipitating contaminants. Preferably, the zirconium salt is a zirconium carbonate and more preferably the zirconium salt is $K_2[Zr(OH)_2(CO_3)_2]$. Preferably, the zirconium salt comprises from about 0.05 weight percent to about 50 weight percent of the composition.

In one embodiment of the present invention, the composition includes a zirconium salt and a ferrate salt. In another embodiment, the composition includes a zirconium salt and a reducing agent. In another embodiment of the present invention, the composition includes a zirconium salt and a weighting agent. In another embodiment of the present invention, the composition includes a zirconium salt and an anionic coagulating agent.

Contaminants which can be removed by the method and composition of the present invention can include, but are not limited to, actinide and lanthanide metals, transition metals, heavy metals, suspended solids (either organic, inorganic and/or biological), alkaline earth metals, and similar insoluble materials (and materials which can be made insoluble) in the wastewater.

It has been unexpectedly discovered that the use of a zirconium salt, and in particular a zirconium carbonate such as $K_2[Zr(OH)_2(CO_3)_2]$ can greatly enhance the effectiveness of a composition used to precipitate contaminants. For example, when zirconium carbonate is employed with ferrate, a reducing agent, a weighting agent and an anionic coagulating agent, it has unexpectedly been found that one part per million potassium zirconium carbonate enhances the effectiveness of the composition to the same extent as about 500 parts per million zirconium oxychloride ($ZrOCl_2 \cdot 8H_2O$). Parts per million (PPM) refers to milligrams of the chemical compound per liter of wastewater being treated. In other words, the zirconium carbonate can be equally as effective or more effective than zirconium oxychloride when employed at 1/500 of the concentration. In one embodiment of the present invention, the zirconium salt is added to wastewater in an amount less than about 100 parts per million, preferably less than about 50 parts per million and more preferably in an amount less than about 10 parts per million. Preferably, at least 93 weight percent and more preferably at least 99 weight percent of the contaminants present in the wastewater are precipitated and separated therefrom.

While not wishing to be bound by any theory, it is believed that the zirconium carbonate may be performing the same function as the zirconium oxychloride, however, it is able to perform much more effectively. Another advantage of the zirconium carbonate over zirconium oxychloride is that the carbonate is soluble at higher pHs (e.g. pH 9 to about pH 14), but the zirconium oxychloride is only significantly soluble at room temperatures below about pH 7. Because many of the precipitations are carried out at basic pH, the zirconium carbonate is preferred. It is believed that the zirconium carbonate, when added to water, hydrolyzes almost immediately and polymerizes to form chemical chains as illustrated below:

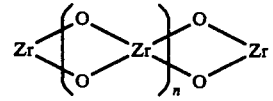

The polymeric zirconium oxides help to bind the insoluble contaminants together, thereby leading to more efficient precipitation of contaminants from the wastewater stream.

In one embodiment of the present invention, the zirconium salt is combined with a ferrate salt. Preferred ferrate salts include alkali metal ferrates and alkaline earth metal ferrates. In particular, potassium ferrate ($K_2FeO_4$) is preferred. Preferably the ferrate is a potassium ferrate produced in accordance with the processes disclosed in U.S. patent application Ser. No. 07/596,877 entitled "Process For Producing Monohydrated Beta-Ferri Oxide and Improved Process For Producing Ferrate Employing Beta-Ferric Oxide" by Deininger, filed on Oct. 12, 1990, and U.S. patent application Ser. No. 07/596,771 entitled, "Process For Producing Ferrate Employing Beta-Ferric Oxide" by Deininger, filed Oct. 12, 1990. Both of these U.S. patent applications are incorporated herein by reference in their entirety.

While not wishing to be bound by any theory, it is believed that ferrate (VI) destabilizes colloids by the formation of multicharged cation iron species when Fe(VI) is reduced to Fe(III). When Fe(VI) in an aqueous system polymerizes to Fe(III), it is then possible for many multicharged cation iron species [Fe(V), Fe(IV), Fe(III)] to form and adsorb onto the surface of the negatively-charged colloids and destabilize the colloids through charge neutralization. The eventual reduction of ferrate (VI) to ferric (III) results in the formation of ferric hydroxide precipitates which agglomerate the colloid particles into larger, settleable solids.

It is also desirable to employ suitable reducing agents in the present composition. While not wishing to be bound by any theory, it is believed that the reducing agent helps insure that the ferrate degrades from Fe(VI) to Fe(III) which precipitates as a hydroxide, when no other reducing agents are present. Therefore, in matrices having a low (e.g. less than about 10 milligrams per liter) concentration of reducing chemicals, the addition of a suitable reducing agent can increase precipitation efficiency. In addition, reducing agents have been found to be effective when used in combination with zirconium carbonate on wastewater streams, including wastewater streams containing chromium.

Examples of suitable reducing agents include nitrites, thiosulfates, hydrosulfites, dithionites, sulfides and other inorganic reducing agents suitable to reduce Fe(VI) to Fe(III). A preferred reducing agent is sodium thiosulfate ($Na_2S_2O_3$).

Preferably, the reducing agent comprises from about 0.5 weight percent to about 50 weight percent of the composition and more preferably from about 5 weight percent to about 20 weight percent of the composition. In an alternative embodiment, wherein zirconium carbonate and a reducing agent are employed in a composition together, the zirconium carbonate comprises from about 0.5 weight percent to about 20 weight percent of the composition and the reducing agent comprises from about 80 weight percent to about 99.5 weight percent of the composition.

In accordance with another embodiment of the present invention, a weighting agent is included in the composition. While not wishing to be bound by any theory, the weighting agent is believed to act as a seed to start the agglomeration process. For example, a preferred weighting agent is $4Mg(CO_3) \cdot Mg(OH)_2 \cdot 5H_2O$. When $4Mg(CO_3) \cdot Mg(OH)_2 \cdot 5H_2O$ is added to a basic solution, it forms a solid hydroxide precipitate, $Mg(OH)_2$. When employed in matrices having low suspended solid concentration, the weighting agent is believed to provide particles with which the zirconium carbonate can agglomerate.

Suitable weighting agents include all weighting agents which can provide seed particles to initiate and continue the precipitation process. Examples of suitable weighting agents include alkaline earth metal salts, and in particular magnesium salts; cadmium, aluminum, calcium, scandium, titanium, vanadium, chromium, manganese, iron, cobalt, nickel, copper and zinc salts; organic weighting agents and aluminosilicates. Preferred weighting agents include magnesium carbonate $4Mg(CO_3) \cdot Mg(OH)_2 \cdot 5H_2O$ and zinc carbonate ($3Zn(OH)_2 \cdot 3ZnCO_3$). Zinc carbonate behaves in a roughly analogous manner to magnesium carbonate, but is believed to form larger particles faster. Therefore, when rapid precipitation is desired, zinc carbonate is a preferred weighting agent, either alone, or in combination with magnesium carbonate. Preferably the weighting agent is present in an amount from about 0.5 weight percent to about 30 weight percent and more preferably is present in the composition in an amount from about 5 weight percent to about 25 weight percent.

In accordance with another embodiment of the present invention, the zirconium salt is combined with an anionic coagulating agent. While not wishing to be bound by an theory, it is believed the anionic coagulating agent helps maintain the agglomeration process. If too much charge reversal occurs the anionic coagulating agent can help correct the situation. Suitable anionic coagulating agents include silicate salts, preferably sodium meta-silicate ($Na_2SiO_3$). Preferably the anionic coagulating agent comprises from about 2 weight percent to about 60 weight percent of the composition and more preferably comprises from about 3 weight percent to about 20 weight percent of the composition.

Other materials may also be present. For example, a salt, such as KCl can be present, for example, in an amount from about 3 weight percent to about 90 weight percent, more preferably in an amount from about 30 weight percent to about 50 weight percent. These other materials are typically by-products formed during the manufacturing process, and can be included in the composition as long as they do not substantially affect the performance of the composition in a negative manner.

One preferred composition in accordance with the present invention includes from about 3 weight percent to about 85 weight percent, preferably from about 5 weight percent to about 25 weight percent and more preferably about 14.3 weight percent potassium ferrate ($K_2FeO_4$); from about 0.5 weight percent to about 30 weight percent, preferably from about 5 weight percent to about 25 weight percent and more preferably about 20.4 weight percent magnesium carbonate, basic ($4MgCO_3 \cdot Mg(OH)_2 \cdot 5H_2O$); from about 0.5 weight percent to about 50 weight percent, preferably from about 5 weight percent to about 20 weight percent and more preferably about 11.7 weight percent sodium thiosulfate ($Na_2S_2O_3$); from about 2 weight percent to about 60 weight percent, preferably from about 3 weight percent to about 20 weight percent and more preferably about 8.1 weight percent sodium meta-silicate ($Na_2SiO_3$); from about 0.05 weight percent to about 50 weight percent, preferably from about 0.1 weight percent to about 10 weight percent and more preferably about 0.8 weight percent potassium zirconium carbonate ($K_2[Zr(CO_3)_2(OH)_2]$); and from about 3 weight percent to about 90 weight percent, preferably from about 30 weight percent to about 50 weight percent and more preferably about 43.5 weight percent salt (KCl).

In accordance with another preferred embodiment of the present invention, a composition is provided which includes from about 3 weight percent to about 85 weight percent, preferably from about 5 weight percent to about 25 weight percent and more preferably about 12.44 weight percent potassium ferrate ($K_2FeO_4$); from about 0.5 weight percent to about 30 weight percent, preferably from about 5 weight percent to about 25 weight percent and more preferably about 18.25 weight percent magnesium carbonate, basic ($4MgCO_3 \cdot Mg(OH)_2 \cdot 5H_2O$); from about 0.5 weight percent to about 50 weight percent, preferably from about 5 weight percent to about 20 weight percent and more preferably about 10.95 weight percent sodium thiosulfate ($Na_2S_2O_3$); from about 0.5 weight percent to about 30 weight percent, preferably from about 5 weight percent to about 25 weight percent and more preferably about 10.22 weight percent zinc carbonate, basic ($3Zn(OH)_2 \cdot 3ZnCO_3$); from about 2 weight percent to about 60 weight percent, preferably from about 3 weight percent to about 20 weight percent and more preferably about 7.30 weight percent sodium meta-silicate ($Na_2SiO_3$); from about 0.05 weight percent to about 50 weight percent, preferably from about 0.1 weight percent to about 10 weight percent and more preferably about 0.73 weight percent potassium zirconium carbonate ($K_2[Zr(CO_3)_2(OH)_2]$); and from about 3 weight percent to about 90 weight percent, preferably from about 30 weight percent to about 50 weight percent and more preferably about 40.11 weight percent salt (KCl).

In accordance with another preferred embodiment of the present invention, a composition is provided which includes from about 0.1 weight percent to about 50 weight percent, preferably from about 0.5 weight percent to about 20 weight percent and more preferably about 2.7 weight percent zirconium salt (preferably potassium zirconium carbonate) and from about 5 weight percent to about 99.9 weight percent, preferably from about 80 weight percent to about 99.5 weight percent and more preferably about 97.3 weight percent reducing agent, preferably sodium thiosulfate.

In accordance with the present invention, a preferred method is provided for treating wastewater to remove contaminants. The method includes adjusting the pH of a contaminant-containing solution to within a range from about pH 6.5 to about pH 14, and preferably within a range of about pH 9 to about pH 13. A composition, as described hereinabove is added to the wastewater. Preferably from about 10 parts per million to about 500 parts per million composition is added to the wastewater, more preferably from about 60 parts per million to about 180 parts per million and more preferably about 120 parts per million. The composition results in the precipitation of contaminants, which are allowed to separate, yielding a supernatant liquid having a reduced contaminant concentration. The supernatant liquid is then separated from the contaminants. Preferably, the supernatant liquid contains at least 93 weight percent less contaminants and more preferably at least 99 weight percent less contaminants than contained in the original wastewater.

It is typically necessary to employ a form of coagulation/flocculation technique in order to insure that coagulation and/or flocculation occurs. Typically, the technique comprises agitation, such as stirring or the creation of turbulent flow, for example, by flowing the wastewater past baffles. The temperature of the wastewater can vary widely, and is preferably from about 0° C. to about 85° C.

EXAMPLES

Comparative Example 1

A simulated aqueous wastewater stream sample was prepared which had a concentration of 20 milligrams per liter of $Cu^{+2}$ at pH 7.5. One thousand milliliters of the simulated wastewater sample was placed into a glass beaker. Using a flat-bladed mixer, fast mixing at about 250 rotations per minute (RPM) was begun. The pH of the solution was adjusted to pH 10.0 using drop-wise addition of NaOH concentrated caustic solution. After 1 minute of fast mixing, the stirring speed was turned down to 23 RPM to allow coagulation and flocculation to occur. Slow stirring was continued for 30 minutes, and then the stirrer was stopped. The flocculated slurry was allowed to settle quiescently for 60 minutes. A sample of the clarified supernatant was taken from the top of the beaker solution and was analyzed for copper. The analysis showed that the supernatant contained 1.3 milligrams per liter of copper. The treatment results show that about 93.5% of the copper was removed using NaOH treatment.

Example 2

A sample of the same batch of simulated aqueous wastewater containing 20 milligrams per liter of $Cu^{+2}$ at pH 7.5 from Example 1 was used. One thousand milliliters of the simulated wastewater sample was placed into a glass beaker. Using a flat-bladed mixer, fast mixing at about 250 RPM was begun. The pH of the solution was adjusted to pH 10.0 using drop-wise addition of NaOH concentrated caustic solution. To the stirring solution was added 0.003 grams of potassium zirconium carbonate $K_2[Zr(CO_3)(OH)_2]$. After 1 minute of fast mixing, the stirring speed was turned down to 23 RPM to allow coagulation and flocculation to occur. Slow stirring was continued for 30 minutes, and then the stirrer was stopped. The flocculated slurry was allowed to settle quiescently for 60 minutes. A sample of the clarified supernatant was taken from the top of the beaker solution and was analyzed for copper. The analysis showed that the supernatant contained 0.02 milligrams per liter of copper.

The treatment results show that about 99.9% of the copper was removed using caustic and potassium zirconium carbonate treatment. Comparison of Examples 1 and 2 shows that the use of potassium zirconium carbonate treatment is clearly superior to removing the copper contaminant from the wastewater by the use of caustic alone.

Example 3

A chemical composition was formulated containing 72.3 milligrams of solid powdered 25 weight percent $K_2FeO_4$ and 65 weight percent KCl, 26.9 milligrams of "Floc Enhancement Additive" which consisted of 25 milligrams of $4Mg(CO_3) \cdot Mg(OH)_2 \cdot 5H_2O$ and 1 milligram of $K_2[Zr(CO_3)_2(OH)_2]$, 0.330 milliliters of stock solution made by diluting 5 milliliters of 45 weight percent KOH solution to 20 milliliters with deionized water, then adding and dissolving 0.6241 grams of $Na_2SiO_3$, 0.8959 grams of $Na_2S_2O_3$ and 0.5846 grams of $ZnCO_3$.

A simulated aqueous radioactive waste sample was prepared by dissolving 0.5 milliliters of 0.15 g/l $Pu^{239}$ and 0.15 g/l $Am^{241}$ solutions into ordinary tap water, making up to 2,000 milliliters of solution. Analysis of the sample showed that it contained about $2.95 \times 10^6$ picocuries per liter as alpha activity.

One thousand milliliters of the simulated waste sample was placed into a beaker. Using a flat-bladed mixer, fast mixing at 280 RPM was begun. The pH of the solution was adjusted to 11.5 using dropwise addition of 45 weight percent KOH. To the stirring solution was added 0.33 milliliters of the above KOH caustic solution containing sodium silicate, sodium thiosulfate and zinc carbonate. Then 26.9 milligrams of the above Floc Enhancement Additive containing magnesium carbonate and potassium zirconium carbonate was added to the stirring solution. Finally, 72.3 milligrams of 25 weight percent potassium ferrate was added. Using this method, the chemicals added to the solution made up of an equivalent solids formulation of:

|  | Wt % | mg/l in solution |
| --- | --- | --- |
| $K_2FeO_4$ | 14.3 | 18.1 |
| $K_2[Zr(CO_3)_2(OH)_2]$ | 0.8 | 1.0 |
| $4Mg(CO_3)_2 \cdot Mg(OH)_2 \cdot 5H_2O$ | 20.4 | 25.9 |

|  | Wt % | mg/l in solution |
|---|---|---|
| KCl | 37.1 | 47.0 |
| $Na_2SiO_3$ | 8.1 | 10.3 |
| $Na_2S_2O_3$ | 11.7 | 14.8 |
| $Zn(OH)_2 \cdot 3ZnCO_3$ | 7.6 | 9.6 |
| Total = | 100.0% | |

After 1 minute of fast mixing, the stirring speed was turned down to 20 RPM to allow flocculation and coagulation to occur. Slow stirring was continued for 30 minutes, and then the stirrer was stopped. The flocculated slurry was allowed to settle quiescently for 2 hours. A sample of the clarified decantant was taken from the top of the beaker solution and analyzed for alpha radioactivity. The analysis showed that the sample contained an alpha activity after treatment of $1.83 \times 10^5$ picocuries per liter.

The treatment results show that about 93.8% of the alpha radioactivity was removed using the above treatment which used potassium zirconium carbonate as the source of zirconium at an equivalent dose of 0.26 mg/l Zr.

Comparative Example 4

A simulated aqueous radioactive waste sample was prepared by dissolving 0.25 milliliters of an acidic solution containing 0.15 g/l $Pu^{239}$ and 0.15 g/l $Am^{241}$ into ordinary tap water, making up to 1,000 milliliters of solution. Analysis of the sample showed that it contained about $2.77 \times 10^6$ picocuries per liter as alpha activity.

One thousand milliliters of the simulated waste sample was placed into a beaker. Using a flat-bladed mixer, fast mixing at 280 RPM was begun. The pH of the solution was adjusted to pH 11.6 using dropwise addition of 45 weight percent KOH. Then 0.512 grams of hydrated zirconyl oxychloride ($ZrOCl_2 \cdot 8H_2O$) was added, 0.071 grams of 25 weight percent $K_2FeO_4$ and about 65 weight percent KCl was added and 10 weight percent KOH was added. After 1 minute of fast mixing, the stirring speed was turned down to 20 RPM to allow flocculation and coagulation to occur. Slow stirring was continued for 30 minutes, and then the stirrer was stopped. The flocculated slurry was allowed to settle quiescently for 2 hours. A sample of the clarified decantant was taken from the top of the beaker solution and analyzed for alpha radioactivity. The analysis showed that the sample contained an alpha activity after treatment of $1.39 \times 10^5$ picocuries per liter.

The treatment results show that about 95 percent of the alpha radioactivity was removed using zirconyl oxychloride at an excessively high, impractical and expensive dosage level, along with ferrate in the treatment formula.

Therefore, almost equal removal of alpha radioactivity was obtained in Example 3 using about 1/550th the dose of Zr as potassium zirconium carbonate, compared to the dose of Zr as zirconium oxychloride used in Comparative Example 4. This clearly demonstrates that use of potassium zirconium carbonate and ferrate treatment is superior in the practical removal of actinide contaminants from wastewater as compared to the use of zirconyl oxychloride and ferrate treatment.

Example 5

A sample of chromium-containing aqueous waste from a commercial electroplating facility wa obtained. The sample was chemically analyzed and was shown to contain a total amount of chromium metal of 2870 milligrams per liter. Further analysis showed that the total chromium consisted of 2,500 milligrams per liter as $Cr^{+6}$ and 370 milligrams per liter as $Cr^{+3}$. The sample had a pH of 1.26.

One hundred milliliters of this aqueous sample was diluted to 1,000 milliliters using laboratory tap water in a large beaker. Using a flat-bladed mixer, fast mixing at about 200 rotations per minute (RPM) was begun. Using dilute $H_2SO_4$, the pH was adjusted to pH 2.0. Two thousand five hundred milligrams of sodium thiosulfate ($Na_2S_2O_3$) and 70 milligrams of potassium zirconium carbonate ($K_2[Zr(CO)_3(OH)_2]$) were added. Fast mixing was continued for another 5 minutes. The pH was then adjusted to pH 11.0 using 50 weight percent NaOH, and then the stirring speed was reduced to 20 RPM to allow flocculation and coagulation to occur. Slow stirring was continued for 30 minutes, and then the stirrer was stopped. The flocculated slurry was allowed to settle quiescently for 2 hours. A sample of the clarified decantant wa taken from the top of the beaker solution and analyzed for chromium. The analysis showed that the clarified decantant contained 0.01 milligrams per liter as $Cr^{+6}$ and 0.21 milligrams per liter as total chromium.

The treatment results show that about 99.93% of the chromium was removed using sodium thiosulfate and potassium zirconium carbonate treatment. This example demonstrates that zirconium carbonate, along with sodium thiosulfate is effective for removing contaminants from a waste water stream. This example further demonstrates the use of zirconium carbonate without ferrate present.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method for treating contaminant-containing wastewater comprising adding a composition comprising zirconium carbonate to said wastewater in order to precipitate contaminants.

2. The method of claim 1 wherein said zirconium carbonate comprises $K_2[Zr(OH)_2(CO_3)_2]$.

3. The method of claim 1 wherein said composition further comprises a ferrate.

4. The method of claim 3 wherein said ferrate comprises an alkali metal or alkaline earth metal ferrate.

5. The method of claim 1 wherein said composition further comprises a reducing agent.

6. The method of claim 5 wherein said reducing agent comprises a thiosulfate salt.

7. The method of claim 1 wherein said composition further comprises a weighting agent.

8. The method of claim 7 wherein said weighting agent comprises a carbonate salt.

9. The method of claim 1 wherein said composition further comprises an anionic coagulating agent.

10. The method of claim 9 wherein said anionic coagulating agent comprises a silicate salt.

11. The method of claim 1 wherein the pH of said wastewater is in a range from about pH 6.5 to about pH 14.

12. The method of claim 1 wherein the temperature of said wastewater stream is in a range from about 0° C. to about 85° C.

13. The method of claim 1 wherein said composition comprises from about 0.05 weight percent to about 50 weight percent zirconium carbonate, from about 3 weight percent to about 85 weight percent ferrate, from about 0.5 weight percent to about 50 weight percent reducing agent, from about 0.5 weight percent to about 30 weight percent weighting agent and from about 2 weight percent to about 60 weight percent anionic coagulating agent.

14. The method of claim 1 wherein said composition is added to said wastewater in an amount from about 10 parts per million to about 500 parts per million.

15. The method of claim 1 wherein said composition is added to said wastewater in an amount from about 60 parts per million to about 180 parts per million.

16. The method of claim 1 wherein said wastewater is subjected to a coagulation/flocculation step after addition of said composition in order to ensure that coagulation and/or flocculation occurs.

17. The method of claim 16 wherein said coagulation/flocculation step is agitation of said wastewater after said composition has been added to said wastewater.

18. A method for treating wastewater to remove contaminants comprising:
(a) adjusting the pH of a contaminant-containing solution to within the range from about pH 6.5 to about pH 14;
(b) adding a composition comprising:
(i) a ferrate;
(ii) a zirconium carbonate;
(iii) a reducing agent;
(iv) a weighting agent; and
(v) an anionic coagulating agent to said wastewater in an amount sufficient to form a precipitate;
(c) permitting said precipitate in said wastewater to separate and thereby yield a supernatant liquid having a reduced contaminant concentration; and
(d) separating the supernatant liquid having the reduced contaminant concentration.

19. The method of claim 18 wherein said composition is added to said wastewater in an amount from about 10 parts per million to about 500 parts per million.

20. The method of claim 18 wherein said composition is added to said wastewater in an amount from about 60 parts per million to about 180 parts per million.

21. The method of claim 18 wherein said composition is added to said wastewater in an amount of about 120 parts per million.

22. A method for treating wastewater to remove contaminants comprising adding a composition comprising zirconium carbonate to said wastewater in order to precipitate contaminants therefrom, wherein said zirconium salt is added to said wastewater in an amount less than 100 parts per million.

23. The method of claim 22 wherein said zirconium salt is added to said wastewater in an amount less than 50 parts per million.

24. The method of claim 22 wherein said zirconium salt is added to said wastewater in an amount less than 10 parts per million.

25. The method of claim 22 wherein said composition further comprises a ferrate.

26. The method of claim 25 wherein said ferrate comprises an alkali metal or alkaline earth metal ferrate.

27. The method of claim 22 wherein said composition further comprises a reducing agent.

28. The method of claim 27 wherein said reducing agent comprises a thiosulfate salt.

29. The method of claim 22 wherein said composition further comprises a weighting agent.

30. The method of claim 29 wherein said weighting agent comprises a carbonate salt.

31. The method of claim 22 wherein said composition further comprises an anionic coagulating agent.

32. The method of claim 31 wherein said anionic coagulating agent comprises a silicate salt.

33. The method of claim 22 wherein the pH of said wastewater is adjusted to a range from about pH 6.5 to about pH 14.

34. The method of claim 22 wherein the temperature of said wastewater stream is in a range from about 0° C. to about 85° C.

35. The method of claim 22 wherein said composition comprises from about 0.05 weight percent to about 50 weight percent zirconium carbonate, from about 3 weight percent to about 85 weight percent ferrate, from about 0.5 weight percent to about 50 weight percent reducing agent, from about 0.5 weight percent to about 30 weight percent weighting agent and from about 2 weight percent to about 60 weight percent anionic coagulating agent.

36. The method of claim 22 wherein said composition is added to said wastewater in an amount from about 10 parts per million to about 500 parts per million.

37. The method of claim 22 wherein said composition is added to said wastewater in an amount from about 60 parts per million to about 180 parts per million.

38. The method of claim 22 wherein said wastewater is subjected to a coagulation/flocculation step in order to ensure that coagulation and/or flocculation occurs.

39. The method of claim 28 wherein said coagulation/flocculation step comprises agitation of said wastewater after said composition has been added to said wastewater.

40. The method of claim 22 wherein a supernatant is removed from said wastewater after precipitation and said supernatant contains at least 93 weight percent less contaminants than the original wastewater.

41. The method of claim 22 wherein a supernatant is removed from said wastewater having at least 99 weight percent less contaminants than the original contaminant level in said wastewater.

42. A method for treating contaminant-containing wastewater comprising adding a composition comprising:
(a) a zirconium carbonate;
(b) a ferrate;
(c) a reducing agent;
(d) a weighting agent; and
(e) an anionic coagulating agent to said wastewater in order to precipitate contaminants.

43. The method of claim 42 wherein said composition comprises from about 0.05 weight percent to about 50 weight percent zirconium carbonate.

44. The method of claim 42 wherein said composition comprises from about 3 weight percent to about 85 weight percent ferrate.

45. The method of claim 42 wherein said composition comprises from about 0.5 weight percent to about 50 weight percent reducing agent, from about 0.5 weight percent to about 30 weight percent weighting agent and from about 2 weight percent to about 60 weight percent anionic coagulating agent.

46. The method of claim 42 wherein the pH of said wastewater is in a range from about pH 6.5 to about pH 14.

47. The method of claim 42 wherein the temperature of said wastewater stream is in a range from about 0° C. to about 85° C.

48. The method of claim 42 wherein said composition is added to said wastewater in an amount from about 10 ppm to about 500 ppm.

49. The method of claim 42 wherein said composition is added to said wastewater in an amount from about 60 ppm to about 180 ppm.

50. A method for treating wastewater to remove contaminants comprising:
   (a) adjusting the pH of a contaminant-containing solution to within the range from about pH 6.5 to about pH 14;
   (b) adding a composition comprising:
      (i) a zirconium carbonate; and
      (ii) a ferrate; to said wastewater in an amount sufficient to form a precipitate;
   (c) permitting said precipitate in said wastewater to separate and thereby yield a supernatant liquid having a reduced contaminant concentration; and
   (d) separating the supernatant liquid having the reduced contaminant concentration.

51. The method of claim 50, wherein said composition comprises from about 0.05 weight percent to about 50 weight percent zirconium carbonate.

52. The method of claim 50, wherein said composition comprises from about 3 weight percent to about 85 weight percent ferrate.

53. The method of claim 50, wherein said composition further comprises from about 0.5 weight percent to about 50 weight percent reducing agent.

54. The method of claim 50, wherein said composition further comprises from about 0.5 weight percent to about 30 weight percent weighting agent.

55. The method of claim 50, wherein said composition further comprises from about 2 weight percent to about 60 weight percent anionic coagulating agent.

56. A method for treating contaminant-containing wastewater comprising adding a composition comprising:
   a) from about 0.05 weight percent to about 50 weight percent zirconium carbonate;
   b) from about 3 weight percent to about 85 weight percent ferrate;
   c) from about 0.5 weight percent to about 50 weight percent thiosulfate salt;
   d) from about 0.5 weight percent to about 30 weight percent carbonate salt; and
   e) from about 2 weight percent to about 60 weight percent silicate salt;
to said wastewater in order to precipitate contaminants.

* * * * *